United States Patent
Daniels et al.

(10) Patent No.: US 6,682,059 B1
(45) Date of Patent: Jan. 27, 2004

(54) MICROVALVE CONTROLLER FOR PNEUMATICALLY CONTOURED SUPPORT

(75) Inventors: George F. Daniels, Stratham, NH (US); Richard D Rhodes, Somersworth, NH (US)

(73) Assignee: Ctex Seat Comfort Limited, Burton on Trent (GB)

( * ) Notice: Subject to any disclaimer, the term of this patent is extended or adjusted under 35 U.S.C. 154(b) by 18 days.

(21) Appl. No.: 09/958,220

(22) PCT Filed: Jun. 6, 2000

(86) PCT No.: PCT/US00/15574

§ 371 (c)(1),
(2), (4) Date: Jan. 22, 2002

(87) PCT Pub. No.: WO00/74532

PCT Pub. Date: Dec. 14, 2000

Related U.S. Application Data

(60) Provisional application No. 60/137,873, filed on Jun. 7, 1999.

(51) Int. Cl.[7] .................................................. A47C 7/14
(52) U.S. Cl. ..................................... 267/131; 297/284.6
(58) Field of Search .................................. 267/123, 131, 267/142, 284.6, 284.9, DIG. 3; 137/487.5; 251/129.01, 129.06

(56) References Cited

U.S. PATENT DOCUMENTS

| | | |
|---|---|---|
| 3,326,601 A | 6/1967 | Vanderbilt et al. |
| 3,330,598 A | 7/1967 | Whiteside |
| 4,491,157 A * | 1/1985 | Hashimoto .................. 137/871 |
| 4,570,676 A | 2/1986 | Nishio et al. |
| 4,591,624 A * | 5/1986 | Hall ............................. 526/177 |
| 4,634,179 A | 1/1987 | Hashimoto et al. |
| 4,807,931 A | 2/1989 | Ishida et al. |
| 4,833,614 A | 5/1989 | Saitoh et al. |
| 5,263,765 A | 11/1993 | Nagashima et al. |
| 5,310,111 A | 5/1994 | Linck |
| 5,320,409 A | 6/1994 | Katoh et al. |
| 5,323,999 A * | 6/1994 | Bonne et al. .................. 251/11 |
| 5,570,716 A | 11/1996 | Kamen et al. |
| 5,573,034 A * | 11/1996 | Gabrlik et al. ......... 137/625.25 |
| 5,909,078 A | 6/1999 | Wood et al. |
| 5,994,816 A * | 11/1999 | Dhuler et al. ................ 310/307 |
| 6,098,000 A * | 8/2000 | Long et al. .................... 701/49 |
| 6,102,068 A * | 8/2000 | Higdon et al. ............... 137/341 |
| 6,129,002 A * | 10/2000 | Lisec et al. .................... 91/454 |
| 6,131,879 A * | 10/2000 | Kluge et al. ........... 251/129.06 |
| 6,142,444 A * | 11/2000 | Kluge .................... 251/129.06 |
| 6,273,810 B1 * | 8/2001 | Rhodes, Jr. et al. ........ 454/120 |
| 6,356,811 B1 * | 3/2002 | Beselt ........................ 700/301 |
| 6,386,507 B2 * | 5/2002 | Dhuler et al. .................. 251/11 |
| 6,422,087 B1 * | 7/2002 | Potter ........................... 73/731 |
| 6,427,538 B1 * | 8/2002 | Potter ........................... 73/706 |
| 6,439,264 B1 * | 8/2002 | Ellis et al. ................ 137/596.2 |

OTHER PUBLICATIONS

Robert L. Bratter and Karen W. Markus, MEMS Emerging as Solution for Many Applications, Technological Horizons, Oct. 1999, p. 13.

* cited by examiner

*Primary Examiner*—Jack Lavinder
*Assistant Examiner*—Benjamin A Pezzlo
(74) *Attorney, Agent, or Firm*—Reising, Ethington, Barnes, Kisselle, P.C.

(57) ABSTRACT

A pneumatic support system and controller combination including pressurizable expandable chambers (1); a source of pressure and an exhaust characterized by: a unitary manifold assembly (14) including a circuit board (25); a manifold (27) and one or more microvalves (24) having a silicon based valve actuator responsive to a signal for controlling flow from said manifold with respect to one or more expandable chambers.

21 Claims, 6 Drawing Sheets

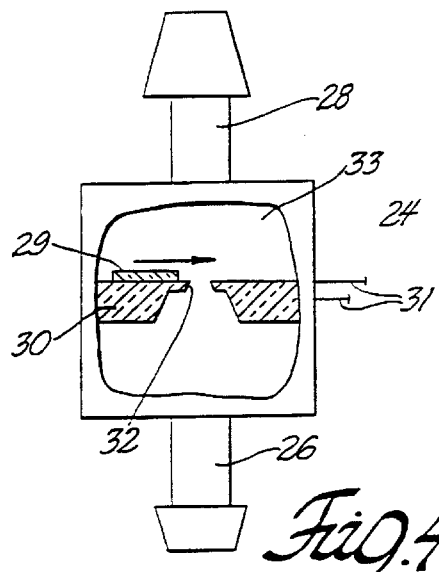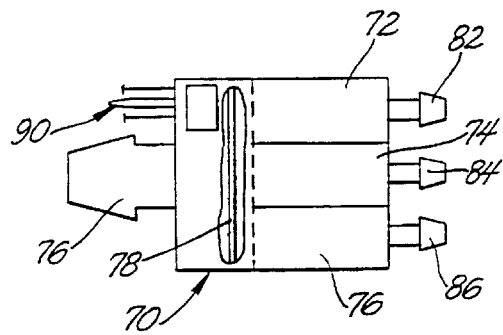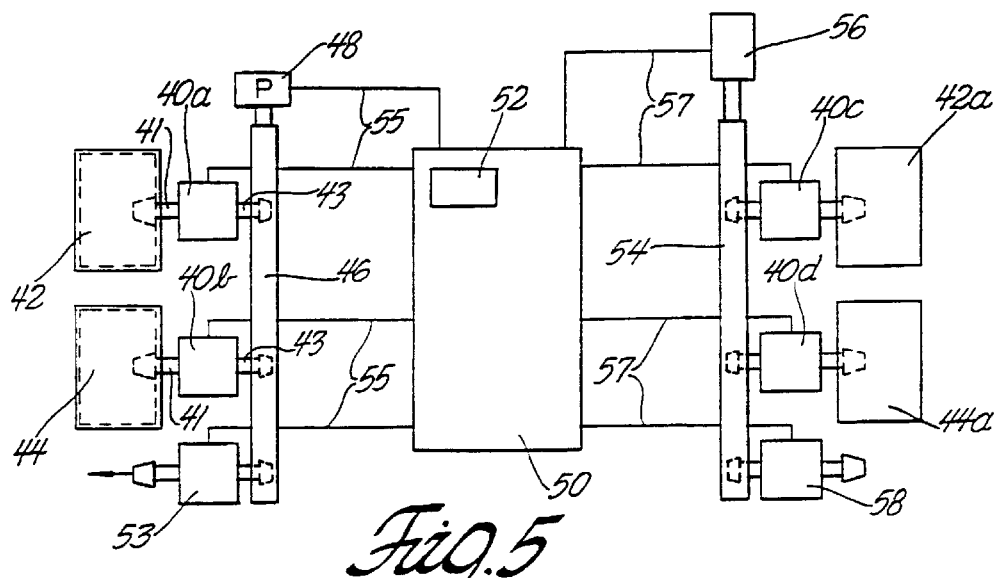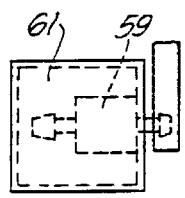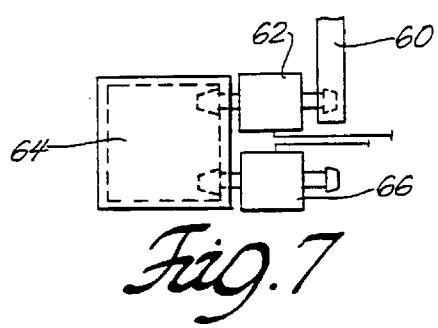

MICROVALVE CONTROLLER FOR PNEUMATICALLY CONTOURED SUPPORT

This application claims benefit of Provisional Application No. 60/137,873, Jun. 7, 1999.

FIELD OF INVENTION

This invention relates to fluid flow controllers for pneumatically contoured supports and more particularly to low energy consumption fluid flow control systems for use in controlling fluid flow in a pneumatically operated system having expandable fluid chambers with a contoured support surface and wherein the fluid control systems include a microvalve having a condition responsive actuator for controlling a relatively large volume of flow through a valve unit.

BACKGROUND OF INVENTION

U.S. patent application Ser. No. 08/808,511, filed Feb. 27, 1997, discloses a pneumatically controlled seating system in which an electronic control module selectively controls energization of a valve unit for controlling air flow from a pressure source to a plurality of pressurizable expandable fluid chambers or air cells.

The valve unit is a low energy consumption valve that is opened and closed by a valve actuator having a low consumption of power during operation of the system. One suitable valve for use in such systems is shown in U.S. Pat. No. 5,447,286 wherein a piezo actuated vent valve is provided to control the air flow through the valve unit. The piezo actuation is provided by a cantilevered member that has a layer of ceramic material bonded to a carrier plate. The ceramic material deforms when a voltage is imposed thereon by the control module. Deformation of the ceramic layer will deflect the carrier plate to open and close the valve.

Additionally, microvalves formed within silicon wafers are known as set-forth in U.S. Pat. Nos. 4,826,131; 4,895,500; 5,909,078 and 5,994,816. Such valves are characterized by low energy consumption and small size and by including a component that is responsive to an imposed condition to move in a manner that will control a valving element to open and close for controlling fluid flow, e.g., to a pressurizable expandable chamber.

One problem with systems for pneumatically contouring support surfaces such as vehicle seats, furniture seats and pneumatically controlled beds is how to interconnect valve control units with pressurized expandable chambers and with a pressure source in a compact and an efficient manner.

SUMMARY OF THE INVENTION

The problem of providing a compactly arranged and easily assembled fluid flow controller for pneumatically contoured supports and such a controller having low energy consumption is addressed in the present invention by incorporating a microvalve formed on a silicon wafer and selectively combined with a controller to provide multiple flow paths to expandable fluid chambers or air cells of a seating or body support system and including at least one microvalve controlled exhaust path from one or more expandable chambers or air cells.

One feature of the present invention is to provide a fluid flow controller of the aforesaid type in which a microvalve arrangement has a printed circuit board supporting a common manifold and one or more microvalves for supplying one or more expandable chambers or air cells.

A further feature is to provide such a fluid flow controller including a microvalve on the printed circuit board that is dedicated solely to providing an exhaust path from the common manifold when predetermined one or more of the expandable chambers or air cells are connected by one or more of the supply microvalves to the common manifold.

Yet another feature is to provide the common manifold as a single tube connected to a lock fitting on the microvalve.

Yet another feature is to provide a single tube connected to a pressure source.

Another feature of the present invention is to provide a fluid flow controller of the aforesaid type in which a first microvalve array includes a supply microvalve directly connected without the use of tubing to one of the expandable chambers or air cells and to a common manifold.

Still another feature is to commonly connect the microvalve to a pressure source and a common circuit board forming an assembly with a suitable controller for electrically connecting each of the microvalves and the pressure source for selectively or commonly pressurizing each of the expandable chambers or air cells during a pump up mode of operation.

Yet another feature is to provide such a microvalve array having an exhaust mode of operation from one or all of the expandable chambers or air cells provided by a microvalve exhaust valve that is connected to the common manifold and operated to exhaust one or more of the expandable chambers or air cells when the power supply to the pressure source is cut-off and one or more of the microvalves is opened in accordance with signals from the controller.

A further feature is to provide such an arrangement wherein a second array of supply microvalves are connected to a second plurality of expandable chambers or air cells and to a second common manifold having a source of pressure connected thereto and a second exhaust microvalve connected thereto and wherein the operation of the second array of supply microvalves, pump and exhaust microvalve is in accordance with a desired operating program that can be the same or different from that of the first microvalves.

Still another feature of the present invention is to provide such an arrangement having microvalve and pressurizable expandable chamber or air cell connections wherein the microvalve is connected to be carried as part of the expandable chamber or air cell either externally or internally of the expandable chamber or air cell.

A still further feature of the present invention is to provide such an arrangement having a common single tube manifold for supply of pressurized fluid through a supply microvalve to one or more expandable chambers or cells and to provide an individual exhaust microvalve at each expandable chamber or cell or group of expandable chambers or cells defining a zone of more than one expandable chambers or cells.

Yet another feature of the present invention is to provide such an arrangement having a multi-functional microvalve module wherein all the supply microvalves are mounted on a common silicon wafer including a single inlet; a condition responsive region in the wafer to control flow to an outlet for supplying one or more expandable chambers or air cells and or to exhaust path from the one or more expandable chambers or air cells.

A further feature is to provide microvalve elements in such controllers wherein an actuator is provided that is condition responsive and operative to control a valve element to control fluid flow with respect to manifolds, expandable chambers and exhausts.

A still further feature is to provide the microvalve elements of the preceding object with a beam that is temperature responsive.

These and other features and objects will be more apparent with reference to the accompanying drawings wherein:

BRIEF DESCRIPTION OF DRAWINGS

FIG. 4 is a diagrammatic view of a microvalve, partially sectioned;

FIG. 5 is a diagrammatic view of another embodiment of the invention wherein a supply microvalve is directly connected by a bayonet type fitting to expandable fluid chamber(s) or air cell(s) of a pneumatically controlled contouring system;

FIG. 6 is a diagrammatic view showing a supply microvalve located internally of an expandable fluid chamber or cell;

FIG. 7 is a fragmentary diagrammatic view showing an individual exhaust microvalve for each zone; and FIG. 8 is an elevational view of a multifunctional microvalve module embodiment of the invention.

DETAILED DESCRIPTION OF PREFERRED EMBODIMENT OF THE INVENTION

Figure 1:
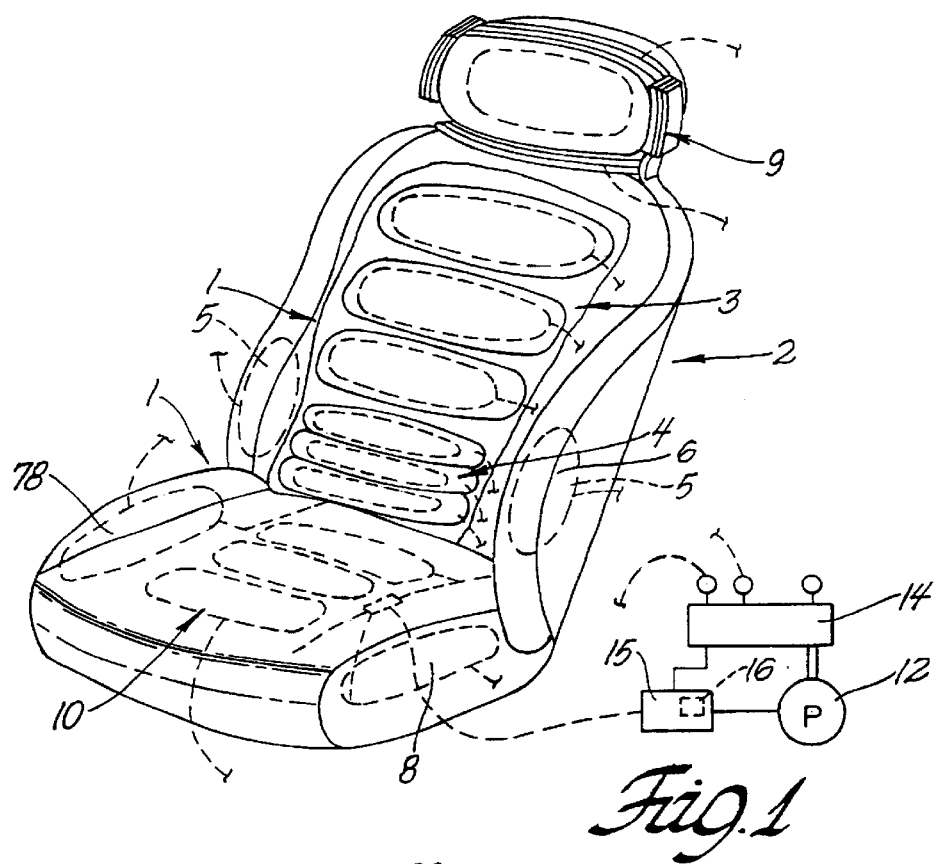
FIG. 1 is a diagrammatic view of a pneumatically operated system having expandable fluid chambers with a contoured support surface in a vehicle seat controlled by the fluid control system of the present invention.

A series of air cells or bladders 1 are placed at strategic locations about the contour of an automotive seat 2 as shown in FIG. 1. The air cell placement is selected to coincide with key pressure points on the body of an occupant of the seat.

In particular, plural cells 3 are positioned in the thoracic region while plural cells 4 are combined in the lumbar region. To further facilitate the adjustment of the seat, pairs of cells 5, 6, 7 and 8 are positioned at either side of the back and seat as well as the front and back of the thighs respectively. Each of these cells is in direct contact with the body to provide the control system with information, which may be related to the comfort of the user.

In addition to the pairs of cells that are provided to adjust the comfort of a user, in accordance with the present invention a plurality of air cells 9 are formed in the headrest and a plurality of air cells 10 are provided in the seat bottom.

Figure 2:
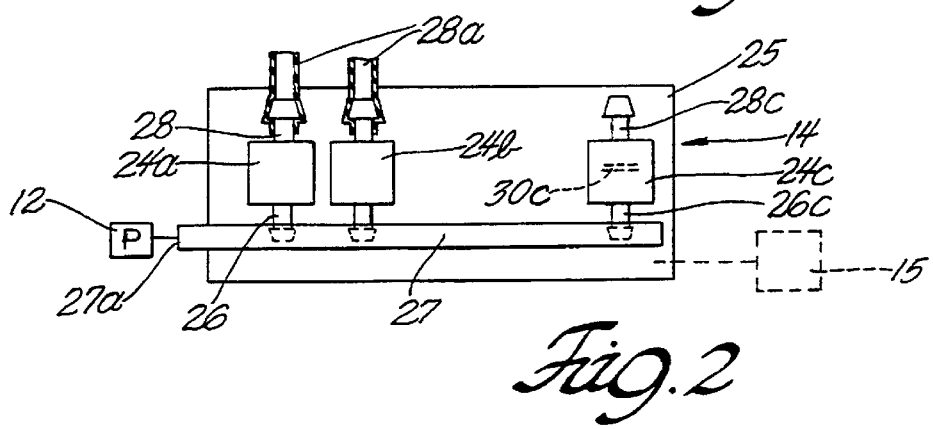
FIG. 2 is a top elevational view of a microvalve, manifold and circuit board assembly in the fluid control system of the present invention.

The cells are connected to a source of pressurized fluid provided in part by a pump 12 through a manifold assembly 14 as shown in FIG. 2. The manifold assembly 14 and pump 12 are operated by a controller 15 such as a microcomputer 16 in response to information stored in the microcomputer which is compared to data provided by a sensor 18. Alternatively, the controller 15 can be a switch arrangement that selectively controls valves (to be discussed) and a power supply for the pump 12.

Each individual cell is constructed of a suitable flexible material such as rubber, thermoplastic polyurethane-coated fabric or any other material provided with a fluid tight connection to the manifold to provide a path for conducting fluid into and out of the cell. The cells may be connected individually to the manifold or jointly with other cells. Individual spaced parallel cells 3,4,9, 10 are located for full body support and constitute a pneumatically operated system having expandable fluid chambers defining a contoured support surface.

While a vehicle seat is shown, such expandable fluid chambers can be used in beds, office furniture, household furniture and other occupant support systems having a support surface therein.

The seating or load support system can also be of the type shown in copending U.S. patent application Ser. No. 09/321, 235 filed May 27, 1999 and incorporated herein by reference and having a common assignee. It should be further understood that the invention as set-forth herein is equally suitable for use in any comfort support system that is contoured by changing the pressure within individual one or more of cells that define the support surface within the system.

The manifold assembly 14 includes microvalves 24a–24c connected to a common circuit board 25; a tube 27 is connected to a plurality of the microvalves 24 by bayonet type inlet fittings 26 thereon so as to support the tube 27 in spaced relationship to the circuit board 25.

As seen in FIG. 4, each microvalve 24 includes an inlet or bayonet type fitting, 26, and an outlet or bayonet type supply fitting 28. The microvalve includes a valve plate 29 movably supported on a microelectronic substrate 30. The valve plate 29 is responsive to signals imposed across control lines 31 to assume a position across a valve opening 32 formed through the substrate 30 to open and close a passage 33 between the inlet 26 and the outlet 28. Such microvalves can be of the microelectromechanical systems or MEMS type disclosed, e.g., in U.S. Pat. Nos. 5,909,078 and 5,994,816 which are incorporated herein by reference. Such valves include a leaf, beam or other mechanical portion as an integrated component within a silicon chip manufactured by known silicon fabrication techniques. In the present application, the valve element is actuated to control fluid flow between the inlet 26 and outlet 28. Various actuation mechanisms are applicable in MEMS type control valves including magnetic, electrostatic, piezoelectric, differential pressure and thermal mechanisms. The mechanisms for operating the valving element can include materials that are shaped memory alloys or bi-metallic materials such as disclosed in our copending U.S. Ser. No. 09/143,784 filed Aug. 31, 1998. In the microvalves used in the assembly of FIG. 2, and in other embodiments to be discussed, electrostatic, differential pressure, and thermal actuation mechanisms are used.

Preferably, the microvalve 24 includes a thermal arched beam electromechanical actuator of the type disclosed in U.S. Pat. Nos. 5,909,078 and 5,994,816. As shown schematically in FIGS. 4A through 4D, the preferred microvalve 24 and includes a silicon valve gate 34 including three rectangular grates 34a–c integrally interconnected in a spaced-apart disposition by a coupler bar 35. The grates 34a–c are slidably disposed over corresponding etched elongated through-holes 36 in the substrate 30. The gate 34 is movable between a normally closed position shown in FIGS. 4A and 4B and an open position shown in FIGS. 4C and 4D. In the closed position, the grates 34a–c close the through-holes 36 blocking air flow through the passage 33. In the open position, the grates 34a–c are clear of the through-holes 36 allowing air to flow through the passage 33. A pair of silicon arched beams 37a, 37b are supported on the substrate 30 at respective opposite beam-ends in a perpendicular relationship to the coupler bar 35. The arched beams 37a, 37b are connected at their approximate centers to the coupler bar 35. When heated by passing electrical current through them, the beams 37a, 37b extend in length resulting in further arching and translational movement of the coupler bar 35 from the closed to the open position. When they are de-energized, the beams 37a, 37b return to their previous length and shape drawing the coupler bar 35 and gate 34 back to the closed position.

Preferably, the microvalve also includes two pairs of thermo-mechanical latches 39a, 39b supported on the substrate 30 immediately adjacent and laterally flanking an outer two grates 34a, 34c of the three grates 34a–c. Each latch of the two pairs of latches 39a, 39b includes a latch detent 45 shaped and positioned to engage a corresponding gate detent 47 on the outer two grates 34a, 34c. Each latch detent 45 is movable between an engaged position shown in FIGS. 4A and 4D and a disengaged position shown in FIGS. 4B and 4C. In their respective disengaged positions, the latch detents 45 allow the gate 34 to move between the open and closed positions. In their respective engaged positions, the latch detents 45 hold the gate 34 in either its open or closed position by engaging the respective gate detents 47. The latches 39a, 39b are actuated by passing electrical current through them. When electrical current is passed through the latches 39a, 39b, the narrower of two longitudinal parallel beams lengthens more than a thicker one of the two beams. This causes the latch detents 45 to pull away from and disengage the gate detents 47.

Figure 4A:
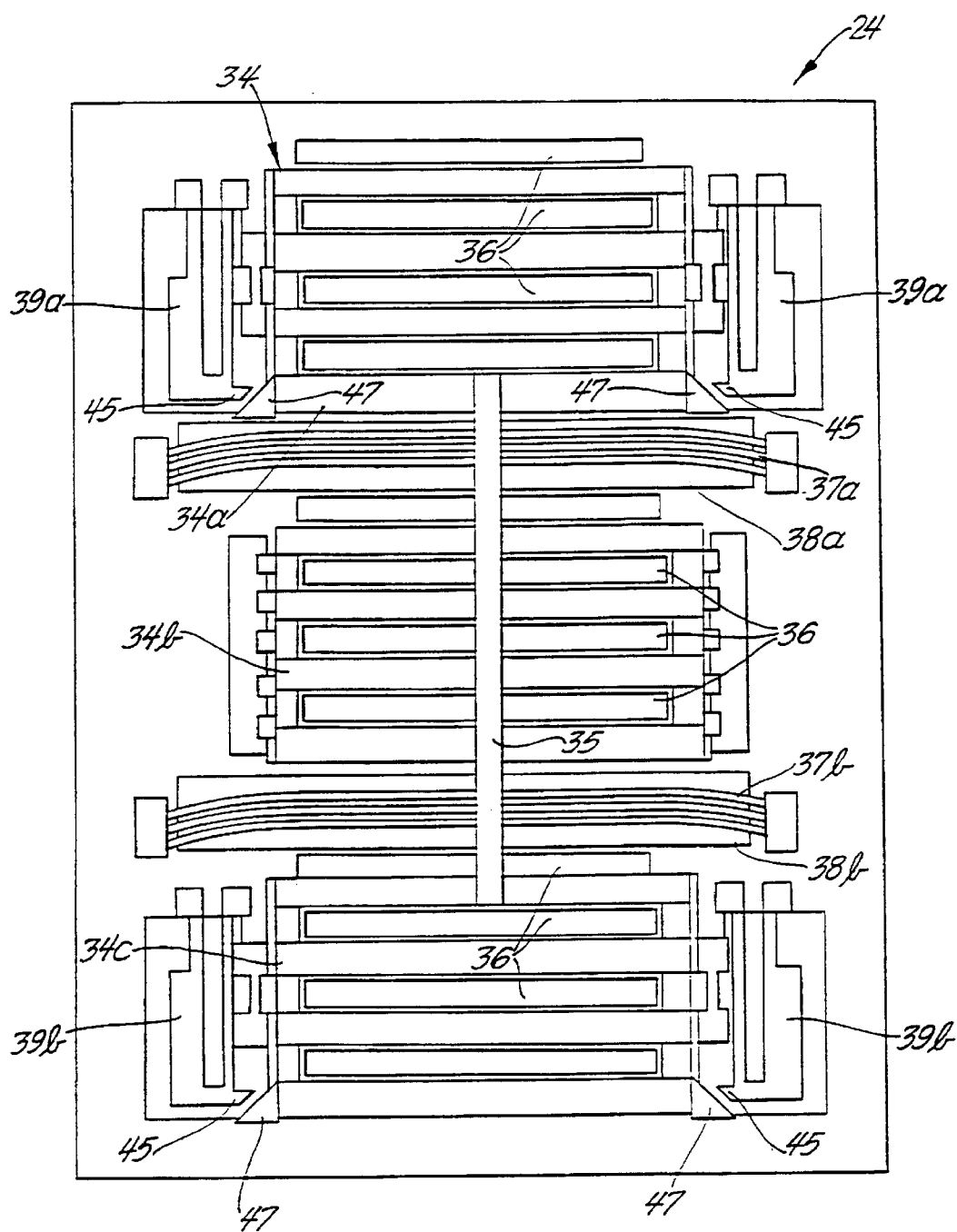
FIG. 4A is a schematic top view of a preferred MEMS valve in a closed position with a mechanical latching mechanism in an engaged position.
Figure 4B:
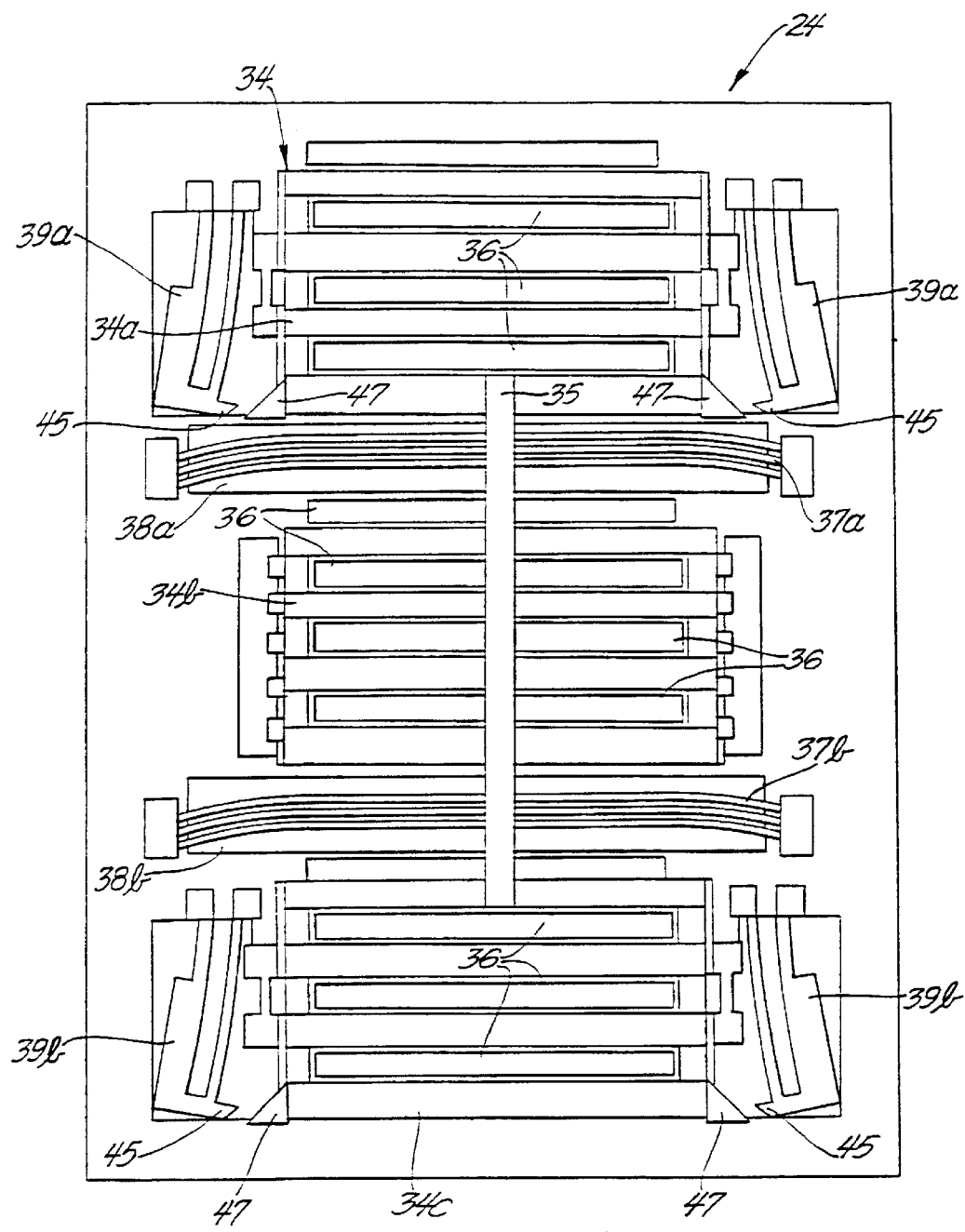
FIG. 4B is a schematic top view of the valve of FIG. 4A in the closed position with the latching mechanism in a disengaged position.
Figure 4C:
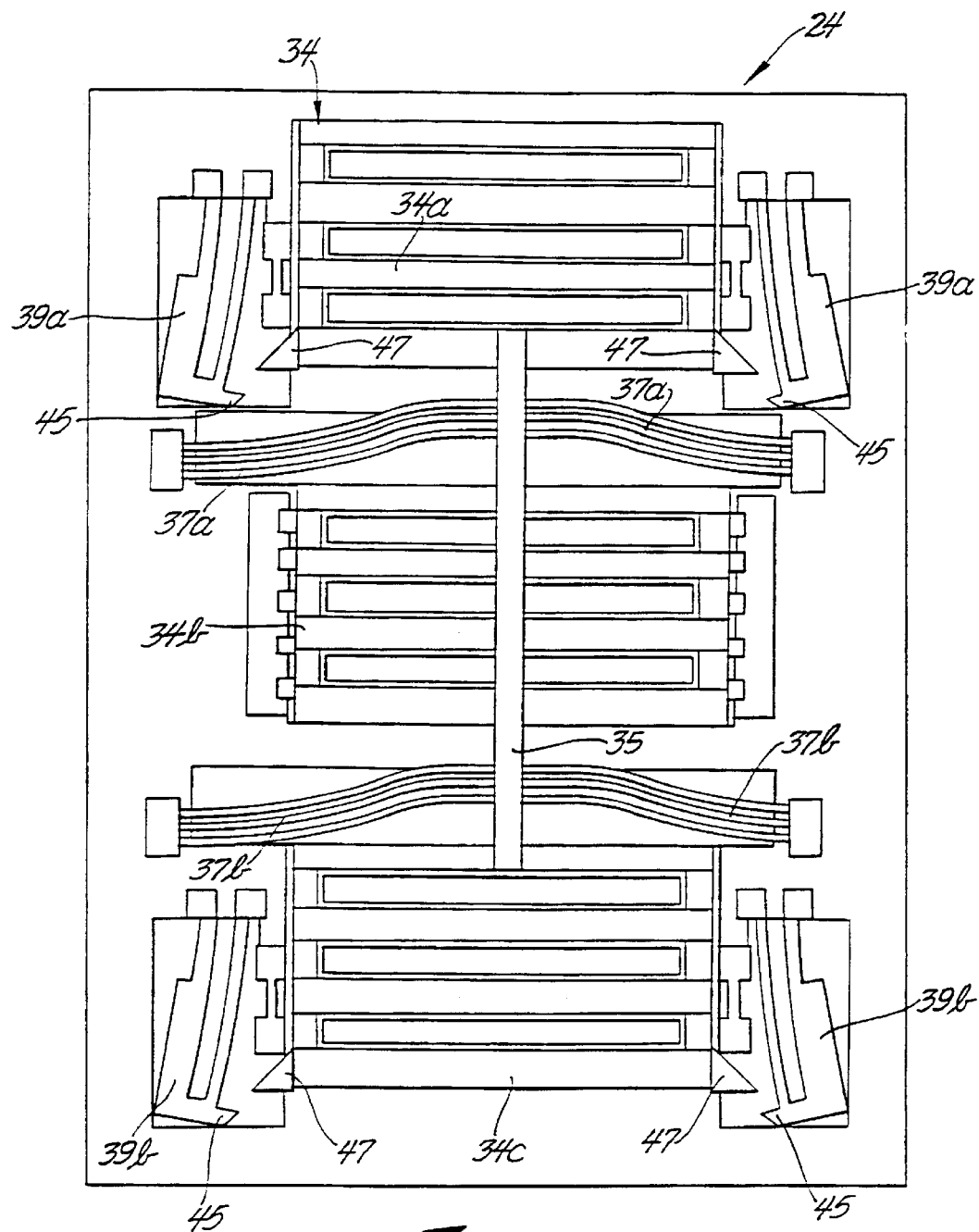
FIG. 4C is a schematic top view of the valve of FIG. 4A in an open position with the latching mechanism in the disengaged position.
Figure 4D:
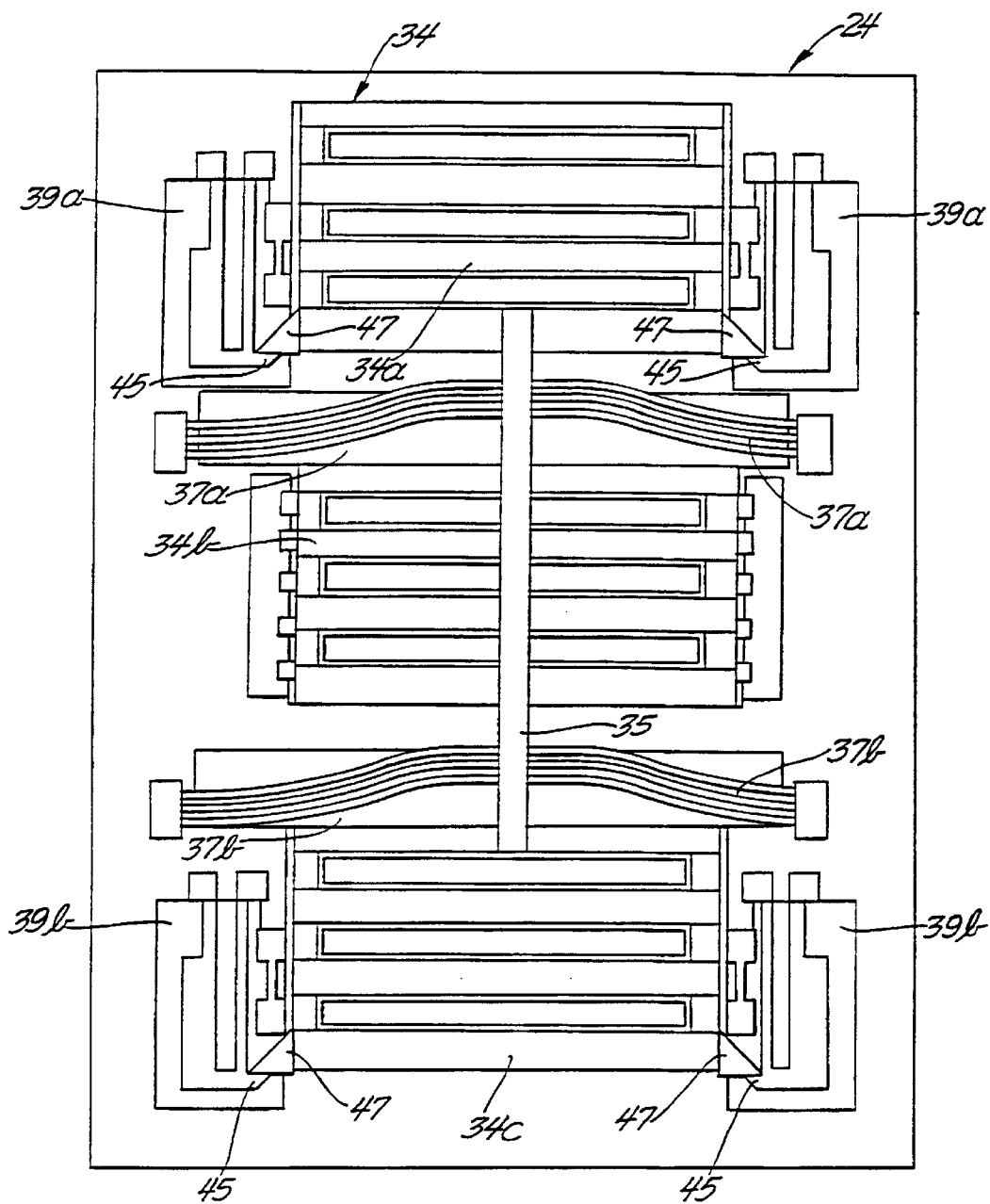
FIG. 4D is a schematic top view of the valve of FIG. 4A in the open position with the latching mechanism in the engaged position.

In operation, to open the microvalve 24, power is supplied to actuate the latches 39a, 39b which then release the gate 34 as shown in FIG. 4B. The beams 37a, 37b are then energized to drive the coupler bar 35 and gate 34 to the open position. As shown in FIG. 4C, in the open position, the grates 34a–c are positioned clear of the through-holes 36. Power is then removed to de-activate the latches 39a, 39b which causes the latch detents 45 to engage the gate detents 47 thus holding the gate in the open position as shown in FIG. 4D. Power is then removed from the beams 37a, 37b and the microvalve 24 remains in the open or "switched" state without power input.

To close the microvalve 24, power is supplied to actuate the latches 39a, 39b which then release the gate 34. The de-energized unheated beams 37a, 37b then pull the coupler bar 35 and gate 34 back to the closed position shown in FIG. 4B. The latches 39a, 39b they are de-energized and re-engage and hold the gate 34 in the closed position.

As shown in FIG. 2, the circuit board 25 is shown carrying a plurality of microvalves 24a-24b that have their inlets formed as bayonet type fittings 26 directed into a common manifold tube 26 so as to support the manifold tube 26 on the circuit board 25. Outlet fittings 28 are connected by tubing 28a to the various cells 1–10. The manifold tube 27 has an inlet end 27a connected to a suitable pressure source such as a pump as set-forth in the aforesaid '511 application. An exhaust microvalve 24c is connected to the manifold tube 27 and includes an inlet 26c, an outlet 28c and a moveable leaf 30c (as previously discussed) that opens and closes a passage through the exhaust microvalve 24c for exhausting the manifold to atmosphere through its outlet 28c.

Figure 3:
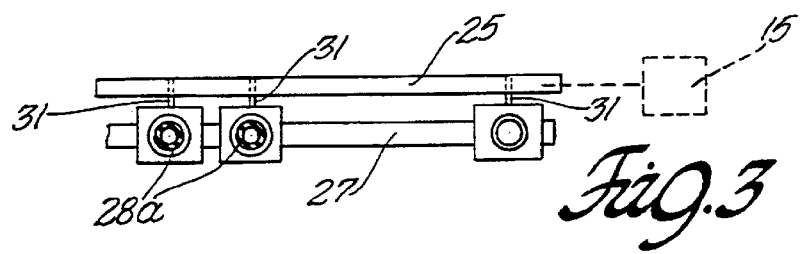
FIG. 3 is a side elevational view of the assembly in FIG. 2.

As can be seen in FIG. 3, the arrangement provides a compact control valve array that eliminates control wiring external of the envelope of a printed circuit board and enables a wide array of valves to be handled as a single unit for ease of assembly with respect to expandable chambers or air cells of a pneumatically controlled support system.

In other cases it might be desirable to contain the microvalves either as a direct connection to a cell internally or externally thereof One such arrangement is shown in FIG. 5 wherein a first array of supply microvalves 40a-40b in which each of the supply microvalves 40a, 40b has its outlet 41 directly connected to one of the expandable chambers or air cells 42, 44 and having their inlets 43 connected to a supply manifold tube 46 that is connected to a pressure source 48. A printed circuit board 50 with a suitable controller 52 (either on the board or separate) is electrically connected to each of the microvalves 40a, 40b and to the pressure source 48 for supplying power to the pressure source for selectively or commonly pressurizing each of the expandable chambers or air cells during a pump up mode. An exhaust mode from one or all of the expandable chambers or air cells is provided by a microvalve exhaust valve 53 that is connected to the common manifold tube 46 and operated to exhaust one or more of the expandable chambers or air cells when the power supply to the pressure source is cut-off and one or more of the microvalves is opened in accordance with signals from a controller 50a on the printed circuit board.

In the embodiment of FIG. 5 one or more exhaust valves can be provided, as can one or more pumps or pressure sources. Thus, on the other side of the printed circuit board 50, (if desired) a second array of supply microvalves 40c, 40d is provided. The microvalves 40c, 40d are connected to a second plurality of expandable chambers or air cells 42a, 44a and to a second common manifold 54 having a source of pressure 56 connected thereto. A second exhaust microvalve 58 is connected to the manifold 54. The operation of the second array of supply microvalves, pump and exhaust microvalve is in accordance with a desired operating program that can be the same or different from that of the first array of supply microvalves.

In the embodiment of FIG. 5, the electrical connection to the control module of the printed circuit board are direct from each of the control and exhaust valves as shown at connections 55 and 57.

While the microvalve and air cell connections are shown external, if desired, a microvalve 59 can be connected internally of an air cell 61 as shown in FIG. 6.

In the embodiment shown in FIG. 7, a common manifold 60 is provided for supply of pressurized fluid through a supply microvalve 62 to a cell 64 and an individual exhaust microvalve 66 can be provided at each cell or group of cells defining a zone of more than one cell.

In the embodiment shown in FIG. 8, a multi-functional microvalve module 70 is shown wherein all the supply microvalves 72, 74 are mounted on the same silicon wafer including a single inlet 76. A pressure-sensing layer 78 is provided in the wafer to sense pressure in the module. A control area array 80 is provided on the wafer. A plurality of outlets 82–84 are provided from the module 70 for supplying one or more cells and or an exhaust outlet 86 from the one or more expandable chambers or air cells via passages (not shown) in the module for connecting one or more of the cells with atmosphere. In this embodiment, the common manifold is integral to the module. Pressure sensing is integral to the module and an open cell valve can be provided to read pressure. The output of the pressure sensor 78 is connected to the control area 80. The control area 80 can either pass the pressure signal to a main controller of the type shown in the '511 application. Alternatively, if the control area 80 is capable, e.g., has a comparator to compare the sensed pressure to a desired pressure control setting, the control area itself can be operative to open or close the valves to the expandable chambers or air cells based on the detected pressure. Furthermore, an output through control lines 90 may control either a remote or integral pump.

What is claimed is:

1. A pneumatic support system and controller combination including:
    a pressurizable expandable chamber;
    a source of pressurized fluid connected to the chamber and configured to supply fluid under pressure to the chamber;
    an exhaust connected to the chamber and configured to release fluid from the chamber; and
    a manifold assembly including:
        a circuit board; and
        a microvalve supported on the circuit board and having a valve actuator comprising silicon and configured to control fluid flow between the chamber and at least one of the source and the exhaust in response to a signal received from one or more circuit components on the circuit board.

2. The pneumatic support system and controller combination of claim 1 in which:
    the microvalve is a supply microvalve that includes:
        an inlet connected to a manifold; and
        an outlet connected to the expandable chamber, the supply microvalve being operative to control pressurized flow from the manifold to the expandable chamber.

3. The pneumatic support system and controller combination of claim 1 in which:
    the manifold is carried by the microvalve;
    the microvalve is connected to the circuit board; and
    the microvalve is operative to control pressure in the expandable chamber.

4. The pneumatic support system and controller combination of claim 2 in which:
    the circuit board is a printed circuit board;
    the microvalve is a supply microvalve electrically connected to the printed circuit board; and
    the supply microvalve is operative to control pressure in the expandable chamber in response to signals received from the printed circuit board.

5. The pneumatic seating or body support system and controller combination of claim 2 in which the manifold assembly includes an exhaust microvalve operative to exhaust the expandable chamber during an exhaust phase of operation.

6. The pneumatic support system and controller combination of claim 2 in which:
    the manifold assembly includes an exhaust microvalve supported on the circuit board;
    the manifold is a common manifold configured to carry both supply and exhaust air; and
    the exhaust microvalve provides an exhaust flow path from the common manifold when the supply microvalve connecting the expandable chamber to the common manifold is open during an exhaust mode.

7. The pneumatic support system and controller combination of claim 1 in which:
    the microvalve is directly connected to the expandable chamber and to a manifold;
    a pressure source is connected to the manifold and a controller; and
    the controller is electrically connected to the microvalve and to the pressure source for pressurizing the expandable chamber during an inflate mode.

8. The pneumatic support system and controller combination of claim 1 in which:
    a first array of supply microvalves is connected to a first plurality of expandable chambers and to a first common manifold having a source of pressure connected thereto;
    a second array of microvalves is connected to a second plurality of expandable chambers and to a second common manifold having a source of pressure connected thereto; and
    the operation of the second array of supply microvalves is in accordance with a desired operating program that can be the same or different from that of the first array of supply microvalves.

9. The pneumatic support system and controller combination of claim 1 in which one or more microvalves is connected to be carried on the expandable chamber as part of the expandable chamber either externally or internally of the expandable chamber.

10. The pneumatic seating or body support system and controller combination of claim 1 further including:
    a common manifold configured to supply pressurized fluid through one or more microvalves to one or more expandable chambers, the one or more microvalves each supplying one expandable chamber or a group of expandable chambers.

11. The pneumatic support system and controller combination of claim 1 further including a multi-functional microvalve module, the microvalve module comprising:
    the microvalve;
    a silicon wafer supporting the microvalve, the microvalve including a single inlet in the wafer, the wafer including:
        a pressure sensing layer;
        a control logic array; and
        an outlet for supplying the expandable chamber and or a flow path from the expandable chamber.

12. The pneumatic support system and controller combination of claim 1 in which the microvalve includes a thermal arched beam electromechanical actuator configured to open and close the microvalve.

13. The pneumatic support system and controller combination of claim 1 in which the microvalve includes a silicon valve gate including a first grate slidably disposed over a first set of corresponding etched through-holes in the substrate, the gate being movable between a closed position closing the first set of through-holes and an open position at least partially opening the first set of through-holes.

14. The pneumatic support system and controller combination of claim 13 in which the valve gate includes at least one additional rectangular grate coupled to and movable with the first grate between a closed position closing a second set of corresponding through-holes etched in the substrate and an open position at least partially opening the second set of through-holes.

15. The pneumatic support system and controller combination of claim 14 further including a silicon arched beam electromechanical actuator supported on the substrate, coupled to the valve gate and configured to drive the valve gate between the closed and open positions.

16. The pneumatic support system and controller combination of claim 15 in which:

the valve gate is normally in the closed position; and the actuator is configured to drive the valve gate from the closed toward the open position when electrical current through the arched beam actuator is increased and to allow the valve gate to move back toward the closed position when electrical current through the arched beam actuator is decreased.

17. The pneumatic support system and controller combination of claim 15 in which:

the valve gate includes a coupler bar mechanically coupling the first grate to the second grate; and the arched beam actuator is drivingly coupled to the coupler bar.

18. The pneumatic support system and controller combination of claim 13 in which the microvalve includes a thermo-mechanical latch supported on the substrate and configured to engage and hold the gate in the open position when the gate is moved to the open position.

19. The pneumatic support system and controller combination of claim 18 in which the latch is configured to release the gate from the open position when sufficient electrical current is passed through the latch.

20. The pneumatic support system and controller combination of claim 13 in which the microvalve includes a thermo-mechanical latch supported on the substrate for movement between a disengaged position allowing the gate to move between the open and closed positions and an engaged position holding the gate in either its open or closed position.

21. The pneumatic support system and controller combination of any of claims 18–20 in which:

the latch includes two longitudinal parallel beams of differing thickness; and the latch moves out of the engaged position in response to the proportionately greater lengthening of the thicker of the two beams in response to an electrical current being passed through the latch.

* * * * *

UNITED STATES PATENT AND TRADEMARK OFFICE
CERTIFICATE OF CORRECTION

PATENT NO. : 6,682,059 B1
DATED : January 27, 2004
INVENTOR(S) : George F. Daniels et al.

It is certified that error appears in the above-identified patent and that said Letters Patent is hereby corrected as shown below:

Drawings,
FIG. 4, #24, has no lead line.

Column 4,
Line 66, after "microvalve 24" delete "and"

Column 5,
Line 57, after "39a, 39b" delete "they" and insert -- then --
Line 62, after "manifold tube" delete "26" and insert -- 27 -- (2 places)

Column 6,
Line 14, after "thereof" insert -- . --

Signed and Sealed this

Twenty-ninth Day of June, 2004

JON W. DUDAS
*Acting Director of the United States Patent and Trademark Office*